United States Patent
Ohmori et al.

(10) Patent No.: US 6,407,984 B2
(45) Date of Patent: *Jun. 18, 2002

(54) LINE FAILURE NOTIFYING APPARATUS FOR TERMINAL APPARATUS

(75) Inventors: Kazuyuki Ohmori; Shigeru Murata; Takamitsu Shirai; Takashi Hashimoto; Akiko Kobayashi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,978

(22) Filed: Mar. 17, 1998

(30) Foreign Application Priority Data

Oct. 20, 1997 (JP) ............................................... 9-287481

(51) Int. Cl.[7] ............................................... H04L 12/26
(52) U.S. Cl. ...................................... 370/244; 370/410
(58) Field of Search ................................. 370/216, 217, 370/218, 219, 220, 221, 222, 223, 224, 225, 226, 227, 228, 241, 242, 243, 244, 245, 246, 247, 248, 249, 250, 251, 395, 400, 410, 498, 522, 395.1, 395.2, 396

(56) References Cited

U.S. PATENT DOCUMENTS

| | | | | |
|---|---|---|---|---|
| 5,343,462 A | * | 8/1994 | Sekihata et al. ............ | 370/244 |
| 5,398,236 A | * | 3/1995 | Hemmady et al. .......... | 370/218 |
| 5,461,607 A | * | 10/1995 | Miyagi et al. ............... | 370/244 |
| 5,491,696 A | * | 2/1996 | Nishimura ................... | 370/225 |
| 5,790,525 A | * | 8/1998 | Ono et al. ................... | 370/244 |
| 5,805,568 A | * | 9/1998 | Shinbashi ................... | 370/223 |
| 5,867,481 A | * | 2/1999 | Miyagi ........................ | 370/244 |
| 6,041,037 A | * | 3/2000 | Nishio et al. ............... | 370/228 |

FOREIGN PATENT DOCUMENTS

| | | |
|---|---|---|
| JP | 5-030075 | 2/1993 |
| JP | 5-136755 | 6/1993 |

* cited by examiner

*Primary Examiner*—Kwang Bin Yao
(74) *Attorney, Agent, or Firm*—Katten Muchin Zavis Rosenman

(57) ABSTRACT

To prevent erroneous recognitions of line failures by a network apparatus, an alarm notifying controller region is provided independent from an actual data region in a connection between a line interface of the network apparatus and a terminal interface unit (line set). When a line is set within the network apparatus, an alarm notification path from the line interface to the line set is simultaneously set. When a line failure is detected by the line interface, information is notified the alarm notification path to all of the line sets connected to this line interface. In the line sets, a signal state of an interface is changed with respect to each sort of terminal interfaces, so that the line failure is notified to the terminal.

6 Claims, 12 Drawing Sheets

LINE FAILURE NOTIFYING APPARATUS FOR TERMINAL APPARATUS

BACKGROUND OF THE INVENTION

1. Field of the Invention

The present invention generally relates to a notification technique for suitably notifying a line failure occurred in a line connection between a network apparatus and a terminal apparatus. More specifically, the present invention is directed to a line failure notifying apparatus capable of simply notifying an occurrence of a line failure to a terminal apparatus.

2. Description of the Related Art

In a system constructed of a network apparatus and a terminal apparatus, the below-mentioned two line failure recognizing methods by the terminal apparatus are conceivable:

(1) When the network apparatus detects a line failure, the network apparatus changes a signal state of a connection interface signal between the network apparatus and the terminal apparatus based on this line failure information. Accordingly, the terminal apparatus recognizes this line failure.

(2) A line failure is recognized by an upper layer of a communication protocol, for example, a session is interrupted, and a protocol fail among the terminal apparatuses.

Among the above-described recognitions, the recognition methods (1) is capable of recognizing the line failure within a short time period. Normally, the network apparatus fixes a data stream to such a data stream having all values of "1" with respect to a lower grade unit when the line failure is detected. However, since there are some possibilities that a data stream having all values of "1" is transmitted from a terminal apparatus on the transmission side, there are many cases that this information could not be directly used to notify the line failure.

Referring now to drawings, the above-described operations will be described.

FIG. 2 shows a basic idea to detect a line failure. FIG. 3 represents such a case that although a network system is operated under normal condition, this condition is erroneously recognized as a line failure.

Network apparatuses (TDMa and TDMb) own line interfaces (NP) and terminal interfaces (LS) as interfaces A control line (CL) is provided between the network apparatuses, independent from a data line (DL). Now, when a failure happens to occur in the line between the network apparatuses, the line interface (NP) of the network apparatus (TDMb) of the reception side detects the line failure, and fixes all values of a data stream into values of "1", which has been received via the data line (DL).

In such a case that a bit stream having, for example, 64 bits of "1" is continuously detected in the terminal interface (LS) of the network apparatus (TDMb), the terminal interface (LS) recognizes this data stream as the line failure to execute a predetermined process operation. In this case, a predetermined process operation involves that in the case of the V.35 protocol by the CCITT rule, "CD" is set from an ON state to an OFF state, and in the case of the X.21 protocol, "I" is set from an ON state to an OFF state.

However, in such a case that such a signal whose bits exceeding 64 bits become accidently and continuously "1" is received via the control line (CL) of the network apparatus TDMa, the terminal interface (LS) of the network apparatus (TDMb) would recognize this bit stream as the line failure, although the data line (DL) is operated under normal condition. As a result, the above-described failure processing operation would be executed.

Therefore, in order to prevent such an erroneous error detection, as indicated in FIG. 4, when the terminal interface (LS) of the network apparatus (TDMa) receives the data having the bit stream exceeding 64 bits and the all values of "1", the following process operation is carried out. That is, the bits of this data (bit stream signal) are inverted every 5 bits. As a result of such a bit inverting operation, since the signal transmitted between the network apparatuses (TDMa) and (TDMb) becomes such a signal having a bit stream of "111101111011110—", the line interface (NP) of the network apparatus (TDMb) on the reception side does not recognize this bit stream as the failure. When this bit stream signal is outputted from the network apparatus (TDMb), the bits which have been inverted in the terminal interface (LS) are returned to the original values thereof, and then this bit stream signal is outputted as a bit stream signal of "1111111111111111—" from the network apparatus TDMb.

However, as represented in FIG. 5, when such a signal whose a partial bit stream "11110" is repeated is entered into the network apparatus (TDMa), another signal in which the value of "1" is continued is inputted into the network apparatus (TDMb) on the reception side. As a consequence, the terminal interface (LS) of the network apparatus (TDMb) would recognize this bit stream signal as the line failure. Thus, there are some possibilities that the above-described failure processing operation would be executed.

As is well known in the field of ATM data communications, in the sending side of an ATM system, bit stream information inputted from a terminal is mapped to the 53 bytes length cell. The 53 bytes cell consists of 5 bytes overhead and 48 bytes payload. The bit stream information is stored in the payload portion.

The receiving side of the ATM system pulls out the 48 bytes length payload from 53 bytes length cell and transmits the payload.

SUMMARY OF THE INVENTION

The present invention has been made to solve the above-described problem, and therefore, has an object to provide a simple technique capable of preventing an erroneous line-failure detection by a network apparatus.

A first arrangement according to the present invention is featured by that failure detection data used to detect a failure occurred between network apparatuses and line data with respect to each of terminals connected to the network apparatus are multiplexed to transmit/receive.

In other words, the failure detection data are not set every communication path, but are multiplexed every terminal. It is therefore possible to suppress the probability to a very small value, at which the specific bit stream implying the failure data is generated though no failure happens to occur. As a consequence, it is possible to avoid such an erroneous failure detection notification to the terminal apparatus.

A second arrangement according to the present invention is featured by such a network apparatus to which a plurality of terminal apparatuses are connected, comprising: a plurality of terminal interfaces for receiving lines connected from the plural terminal apparatuses; multiplexing means for bit-multiplexing signals derived from the plural terminal interfaces; failure-occurrence-notifying bit producing means for replacing the multiplexed bit stream signal by a failure-occurrence-notifying bit stream which implies an occurrence of a failure when the failure occurred in a line is detected; and failure-problem processing means for detecting the failure-occurrence-notifying bit stream to thereby process a line failure problem with respect to the terminal apparatus.

The network apparatus of the second arrangement corresponds to a more concrete arrangement of the previously explained first arrangement, and may be applied to either a more concrete TDM transfer system or a more concrete ATM switching apparatus.

A third arrangement according to the present invention is featured by that in the above-described second arrangement, bit operating means is interposed between the multiplexing means and the failure-occurrence-notifying bit producing means, for rewriting the bit stream signal.

Since such a bit operating means is provided, even when a specific bit stream implying an occurrence of a failure (for example, more than 5 bits of value "1" are continued in a bit stream) is accidently produced in a multiplexed signal stream, the failure detecting process operation is not executed.

A fourth arrangement according to the present invention is featured by such a network apparatus to which a plurality of terminal apparatuses are connected, comprising: a terminal interface for receiving lines connected from the plural terminal apparatuses, including failure notifying means for notifying an occurrence of a failure to the terminal apparatuses; a line interface connected to an external line, including failure detecting means for detecting a failure of the external line; an actual data path for transmitting actual data appearing in both the terminal apparatuses and the external line; and a failure notification path set to the failure detecting means and the failure notifying means.

As described above, in addition to the actual data path, the failure notification path is set with respect to each of the interfaces. As a result, when the failure happens to occur, the signal state is changed with respect to each of the interfaces, so that the occurrence of the line failure can be notified to the terminal apparatus.

A fifth arrangement according to the present invention is featured by that in the above-explained fourth arrangement, a plurality of terminal interfaces for receiving a plurality of own terminal apparatus lines are provided, and on the other hand, the line interface includes: line condition monitoring means for monitoring the occurrence of the failure with respect to each of the external lines; and a failure notifying unit for notifying the occurrence of the failure to the own terminal apparatus communicated with the external line where the occurrence of the failure is detected by the line condition monitoring means; and failure notification paths are set between the failure notifying unit and each of the plural terminal interfaces.

As a consequence, the occurrence of the failure can be individually notified to such a terminal apparatus connected to the line where the failure happen to occur.

A sixth arrangement according to the present invention is featured by such an ATM switching apparatus interposed between a plurality of own terminal apparatuses and an external line, comprising: a terminal interface for receiving lines connected from the plurality of own terminal apparatuses; an ATM switch for switching a cell between the plurality of own terminal apparatuses and the external line; a line interface for receiving the external line and for including failure detecting means for detecting a failure occurred in the external line; path monitoring means for specifying a path of the external line where the failure happens to occur; failure-notifying cell producing/notifying means for producing/transmitting a failure-notifying cell for notifying an occurrence of a failure to such a terminal apparatus for connecting with the external line where the failure happens to occur in response to information transmitted from the failure detecting means, or the path monitoring means; and output control means for instructing the ATM switch to be turned OFF.

With employment of such an arrangement, also in the ATM network, the occurrence of the line failure can be notified to the terminal apparatus by employing the failure notification cell. As a consequence, the failure erroneous recognition can be prevented, and the failure processing operation with respect to the line failure occurred in the ATM switching network can be readily and firmly carried out.

BRIEF DESCRIPTION OF THE DRAWINGS

A more complete understanding of the teachings of the present invention may be acquired by referring to the accompanying figures, in which like reference numbers indicate like features and wherein.

DETAILED DESCRIPTION OF THE PREFERRED EMBODIMENTS

Referring now to drawings, the present invention will be described in detail.

Embodiment Mode 1

Figure 1:
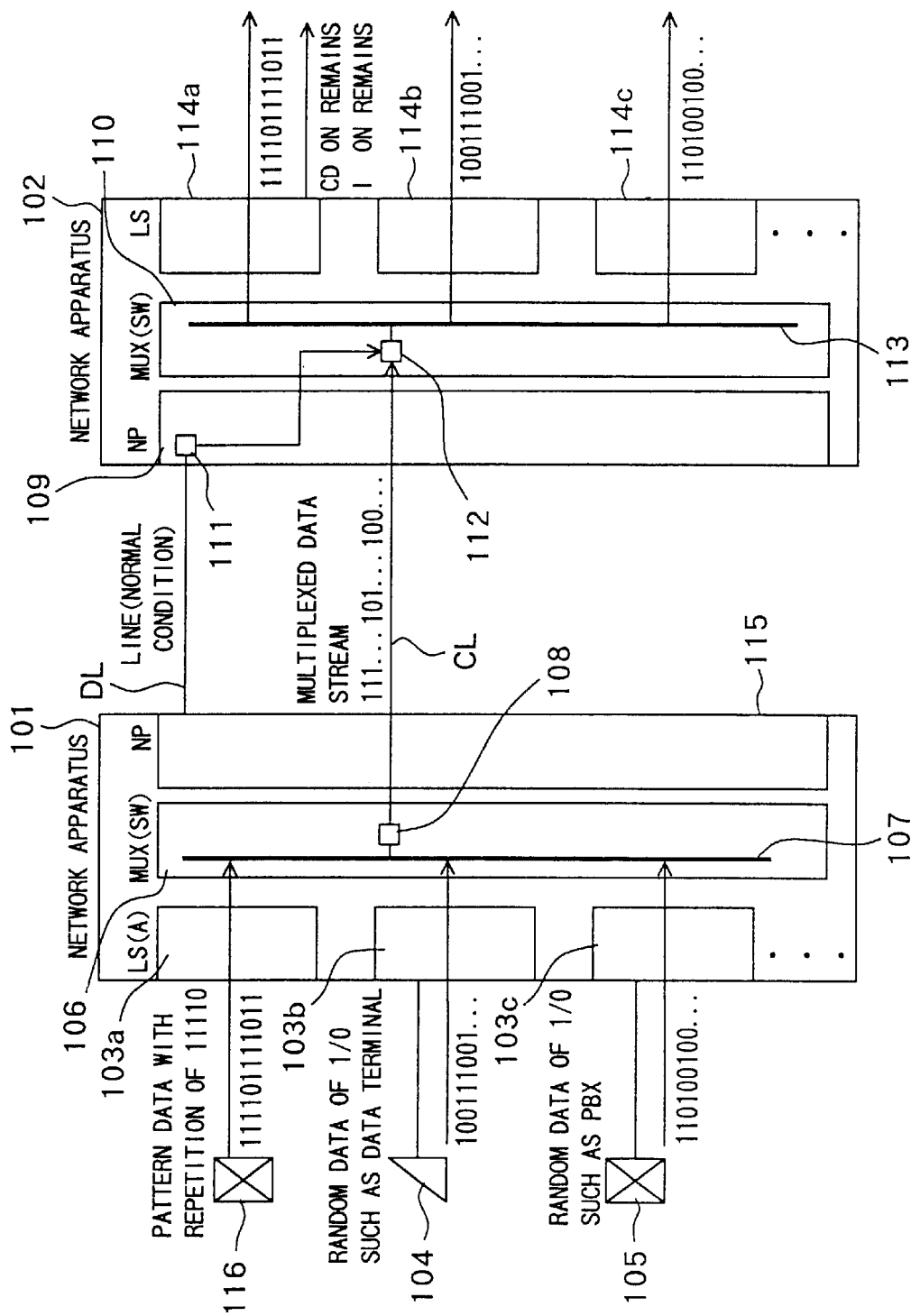
FIG. 1 is an explanatory diagram for explanatorily showing an arrangement of a network apparatus according to an embodiment 1 of the present invention.
Figure 2:
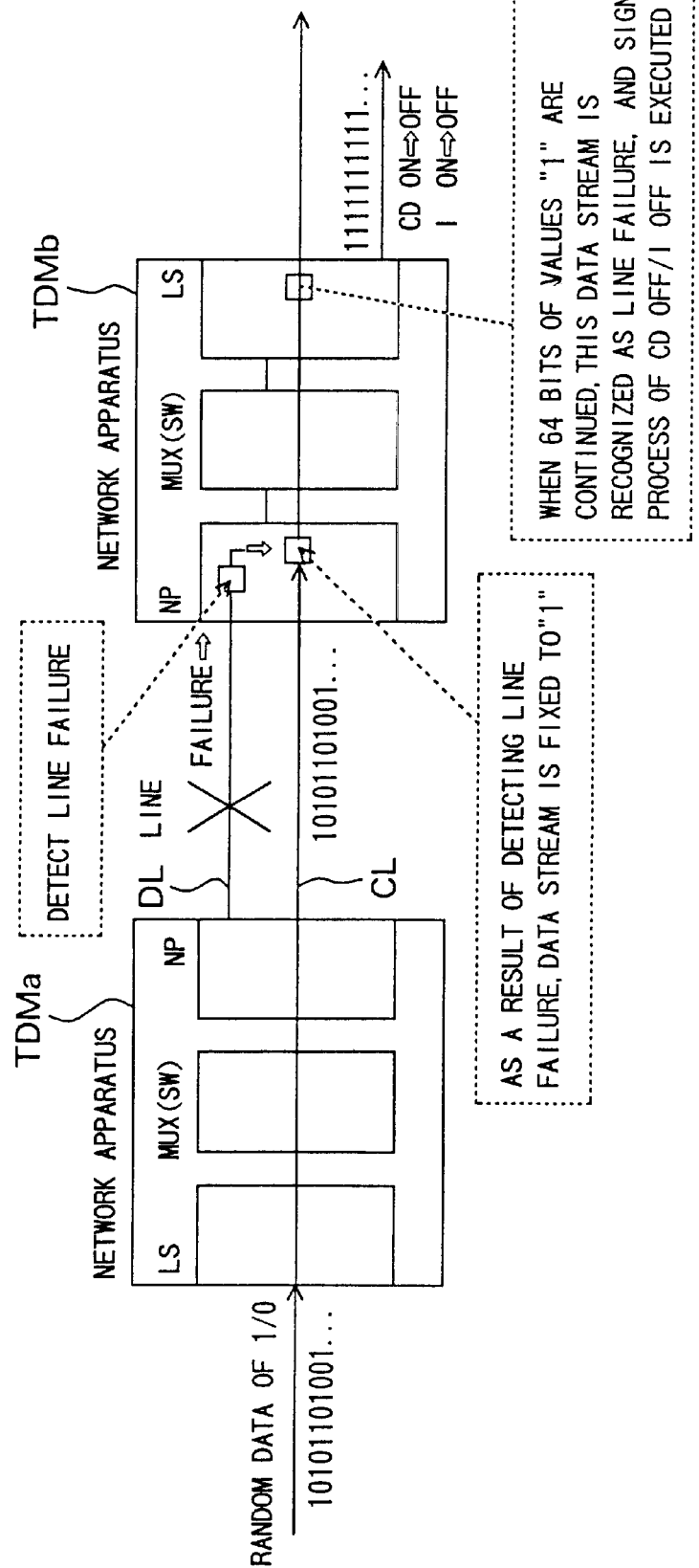
FIG. 2 schematically represents the basic idea how to detect the line failure in the prior art.
Figure 3:
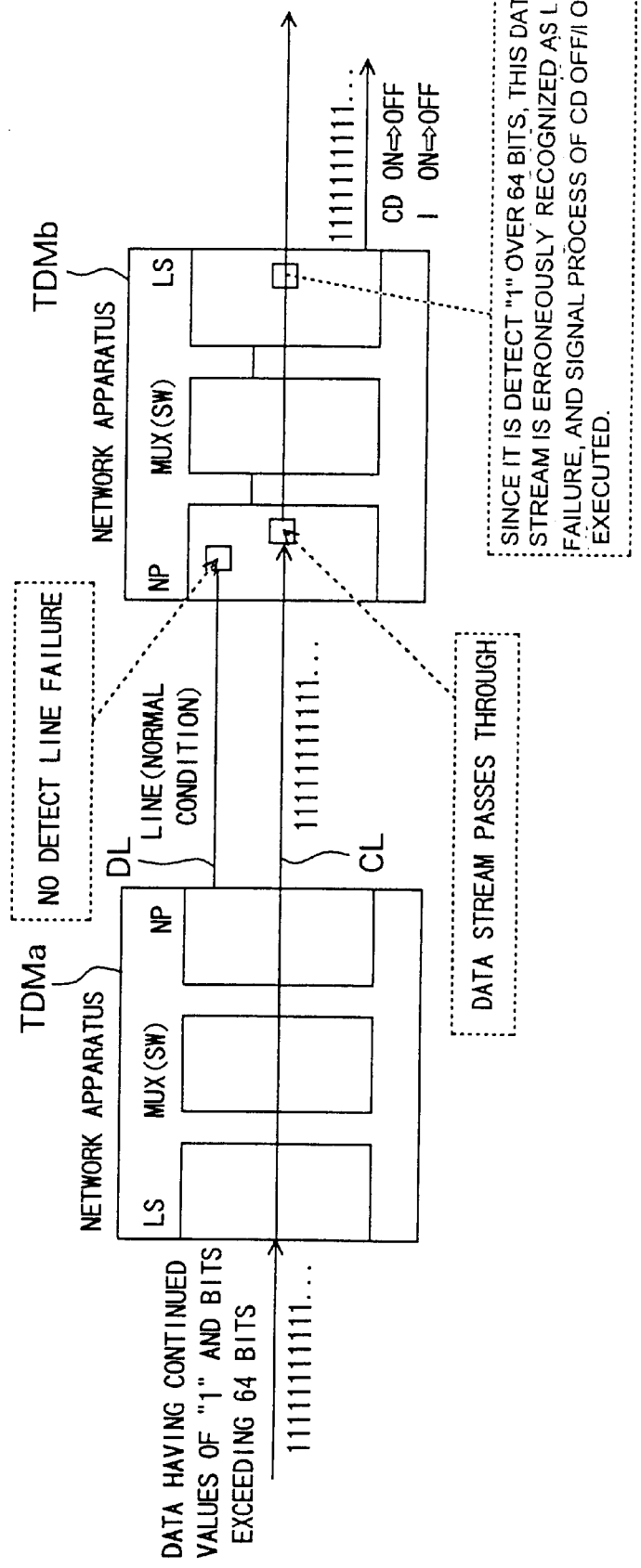
FIG. 3 is the explanatory diagram for explanatorily indicating such a condition that the line failure is erroneously recognized in the prior art.
Figure 4:
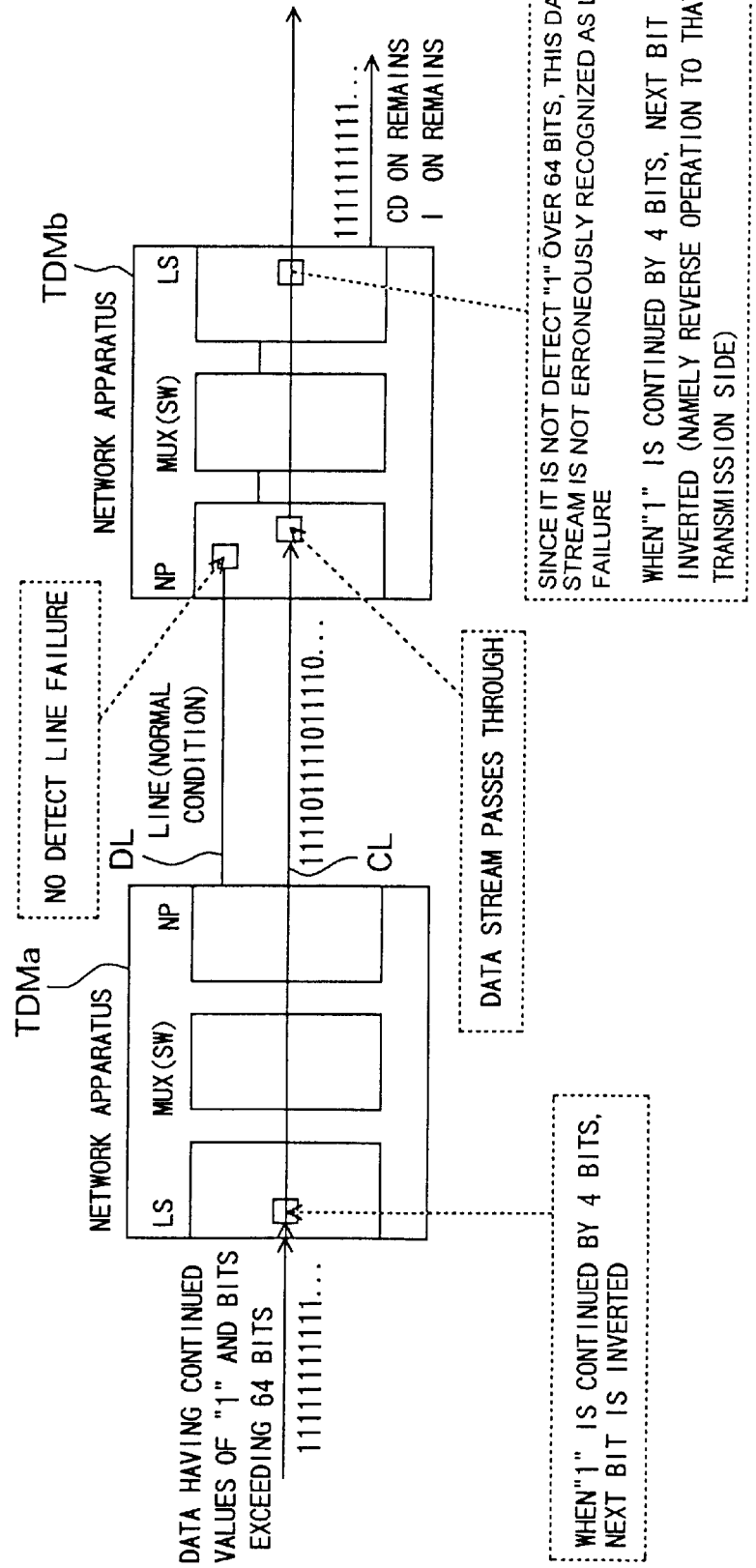
FIG. 4 is the explanatory diagram for explaining the conventional technique for presenting the erroneous recognition of the line failure.
Figure 5:
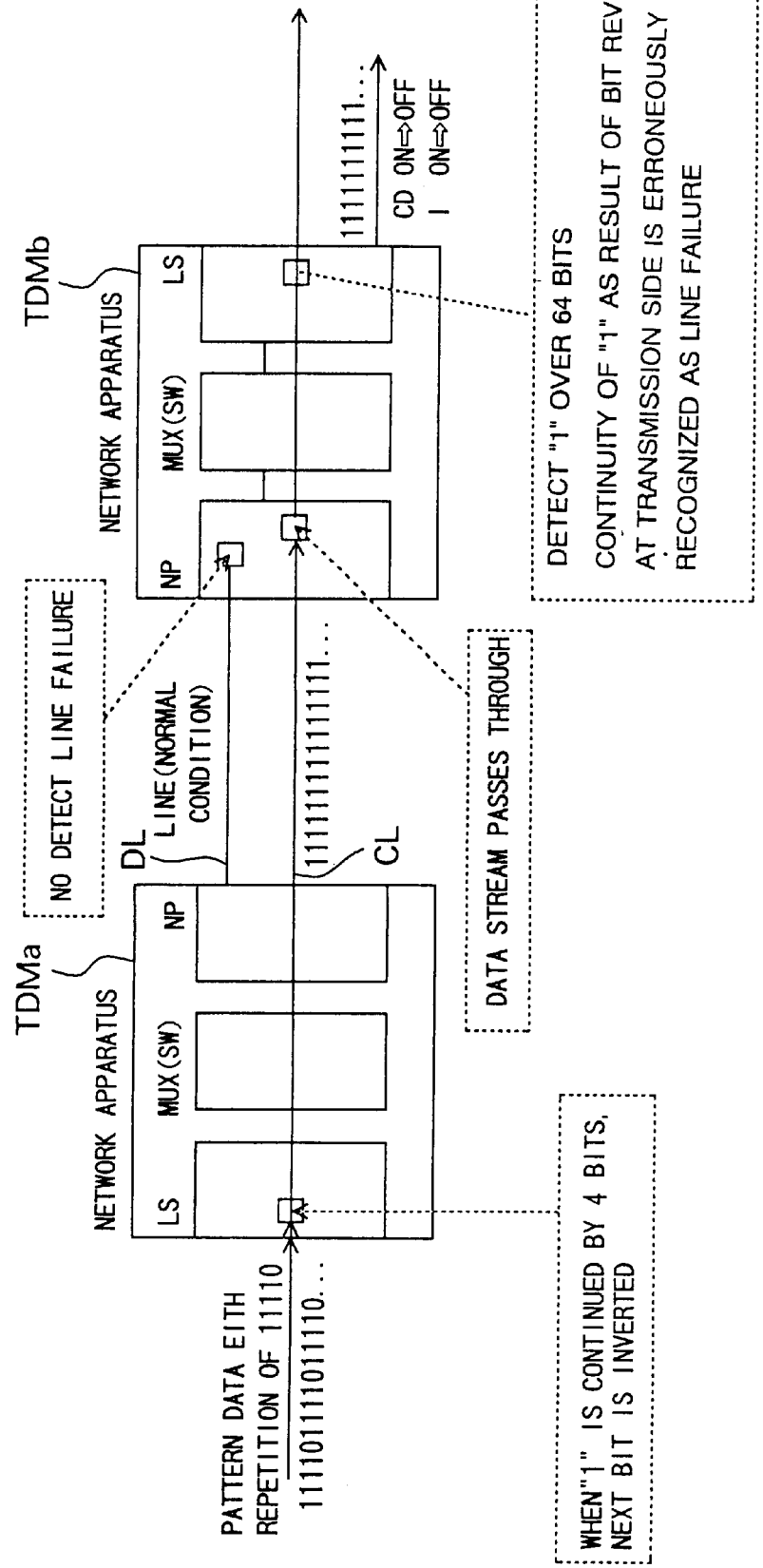
FIG. 5 is the explanatory diagram for explaining the problems of the conventional technique for preventing the erroneous recognition of the line failure.

FIG. 1 schematically shows an arrangement of network apparatus connections in a TDM (Time Divisional Multiple) transfer system, according to an embodiment 1 of the present invention.

As shown in FIG. 1, terminal interfaces 103a to 103c (LS(A) to LS(C)) are employed in a network apparatus 101 functioning as a transmission side. A line originated from a data terminal apparatus 104 is received, or connected to the interface 103b (LS(B)), and also a line originated from a PBX (Private Branch Exchange) 105 is received, or connected to the interface 103c.

The line connected via each of these terminal interfaces 103a to 103c is multiplexed in a multiplexing unit (MUX: multiplexer) 107 of a switch 106. A bit operation unit 108 is provided at a post stage of the multiplexing unit 107, and is capable of operating bits of a specific bit stream. This bit operation will be described later.

A line interface 115 (NP) receives a data line (DL) as a starting terminal.

A multiplexing control line (CL) is provide in parallel to the data line (DL) between the network apparatus 101 functioning as the transmission side and a network apparatus 102 functioning as a reception side.

The network apparatus 102 of the reception side is arranged opposite to the above-described network apparatus 101 of the transmission side, and the above-explained data line (DL) is terminated in a line interface 109 (NP) thereof. A failure detecting unit 111 for detecting as to whether or not a failure happens to occur in the data line (DL) is provided in this circuit interface 109 (NP). When the occurrence of the failure is detected, this failure detecting unit 111 notifies the occurrence of the failure to a bit operating unit 112 of a switch 110.

As previously explained, the network apparatus 102 of the reception side contains the switch 110. This switch 110 owns a function to divide the multiplexed signals with respect to each of the line interfaces 114a to 114c.

It should be noted that for the sake of easy explanations in FIG. 1, the network apparatus 101 of the transmission side and the network apparatus 102 of the reception side own the different functional structures from each other. Alternatively, these network apparatuses 101 and 102 may have the same hardware structures. For example, the multiplexing unit 106 normally has an additional function of the switch 110.

In this drawing, a repetition bit stream (pattern) of, for instance, "11110" is continuously supplied as a multiplexing base signal from an externally provided multiplexing base signal generating apparatus 116 via the line of the terminal interface 103a. This multiplexing base signal owns a function capable of avoiding such a condition that when both data derived from data terminal apparatus 104 and from the PBX 105 become repetition bit patterns having values of "1", if these data are multiplexed, then the multiplexed data would become continuous signals having values of "1".

The signals derived from the multiplexing base signal generating apparatus 116, the data terminal apparatus 104, and the PBX 105 are multiplexed by the multiplexing unit 107 of the switch 106, and thereafter the multiplexed signal is outputted via the bit operation unit 108 and further the line interface 115 to the multiplexing control line (CL). At this time, the bit operating unit 108 performs the following process operation. That is, in such a case that as a result of multiplexing, more than 5 bits of the values of "1" are continued, the 5th bit of these value of "1" is inverted into "0". For example, when the output signal derived from the multiplexing unit 107 is equal to "01111110010—", the bit operated signal is equal to "01111010010—".

In the network apparatus 102 of the reception side, the multiplexed signal processed in the bit operating unit 108 is entered via the line interface 109 to the switch 110, and then a predetermined bit operation by the bit operation unit 112 is performed with respect of this multiplexed signal. The bit operation in this bit operation unit 112 implies that the bit which has been bit-operated in the above-described bit operation unit 108 of the transmission side is returned to the original bit. For example, as previously explained, the bit stream which has been changed into "01111010010—" is returned to "01111110010—".

The resulting signal from the bit operating unit 112 is divided by the dividing unit 113 employed in the switch 110 into subdivided signals every terminal interfaces 114a to 114c, which are outputted to the respective terminal interfaces 114a to 114c.

As described above, in accordance with this embodiment 1, the network apparatus does not recognize the continuities of the bit stream having the value of "1" with respect to each of the terminal interfaces 103a to 103c, but may discriminate the continuities of the bit stream having the value of "1" based upon the multiplexed signal outputted from the multiplexing unit 107. There is very small probability that the multiplexed data stream becomes a specific bit repetition pattern is produced. In particular, in case of voice data, there is substantially zero probability that a specific bit repetition pattern. Moreover, this multiplexed data stream is bit-operated. As. a result, there is no possibility tat the value of "1" is not continued over 64 bits. As a consequence, since the network apparatus of the reception side never detects such a repetition bit stream having the values of "1" continued over 64 bits, the network apparatus does not erroneously detect the occurrence of the line failure.

Embodiment Mode 2

Figure 6:
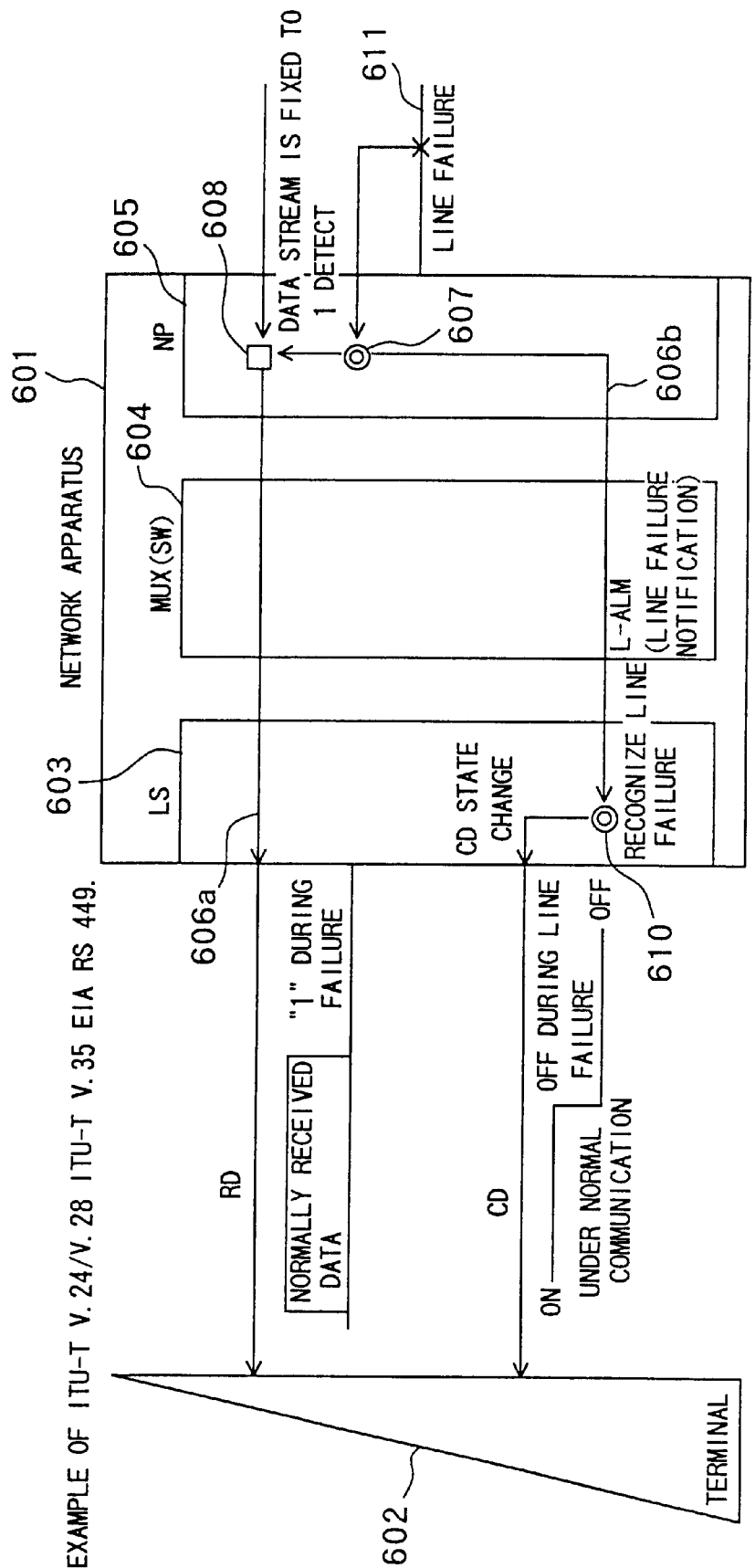
FIG. 6 is an explanatory diagram for explaining notification of a line failure to a terminal apparatus according to an embodiment 2 of the present invention.

FIG. 6 schematically indicates another embodiment mode 2 of the present invention, namely a connection arrangement diagram between a network apparatus 601 and a terminal apparatus 602. The terminal apparatus 602 is standardized in accordance with ITU-TV.24/V.28, ITU-TV.35, and EIA RS449.

In the network apparatus 601, a terminal interface 603 (LS), a switch 604 (MUX(SW)), and a line interface 605 (NP) are constructed similar to those of the embodiment mode 1.

This embodiment mode 2 is featured by that an actual data path 606a and a failure notification path 606b are set between the interfaces.

In this embodiment mode 2, when a failure detecting unit 607 of the line interface 605 (NP) detects a line failure occurred in an external line 611, the failure detecting unit 607 notifies this line failure to a bit operation unit 608. The bit operation unit 608 fixes a data stream to a value of "1" in response to the failure detection notification, and this data stream is to be transmitted to the failure notification path 606a. As a result, the bit stream having the values fixed to "1" are sent to an RD path connected to the terminal apparatus 602. When the above-described failure is detected by the failure detecting unit 607, this failure detecting unit 607 notifies the occurrence of the failure to a line failure recognizing unit 610 via the failure notification path 606b. In the line failure recognizing unit 610, a signal supplied to a CD path connected to the terminal apparatus 602 is switched from the normal line communication (ON) to the abnormal line communication (OFF) in response to this failure notification.

Figure 8:
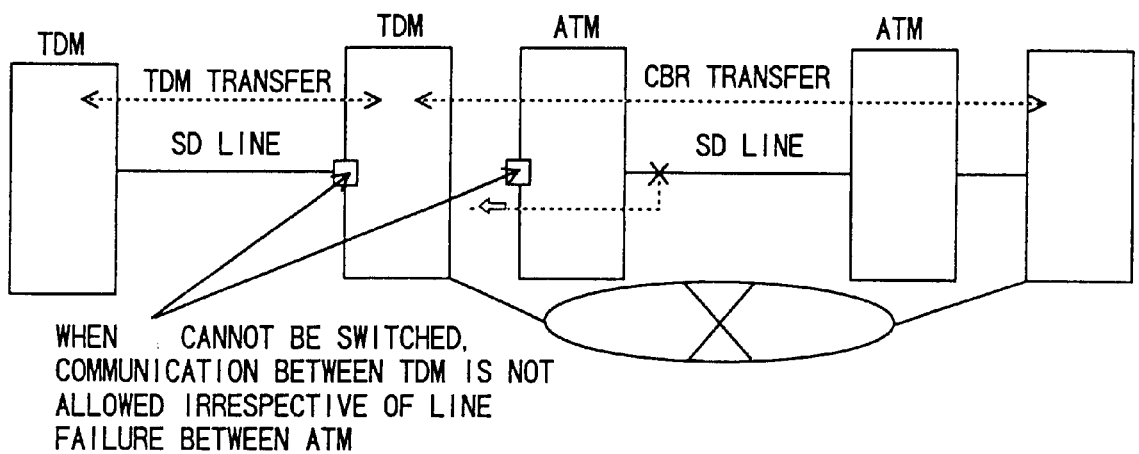
FIG. 8 is an explanatory diagram for explaining such a function that a line failure occurred in an ATM communication network is notified to a TDM network within an ATM/TDM-mixed type network structure.

As described above, in accordance with this embodiment mode 2, the line failure information can be notified via such a path independently provided with the actual communication path. As a consequence, also in a TDM/ATM-mixed type network system arrangement shown in FIG. 8, when a line failure happens to occur between the ATM systems, the line failure can be grasped on the side of the TDM system. As a result, it is possible to switch on the side of the TDM side, and in such a case that the line is detoured between one TDM system and another TDM system, it is possible to obtain a detour trigger. Accordingly, the occurrence of such a failure can be quickly and effectively avoided.

Figure 7:
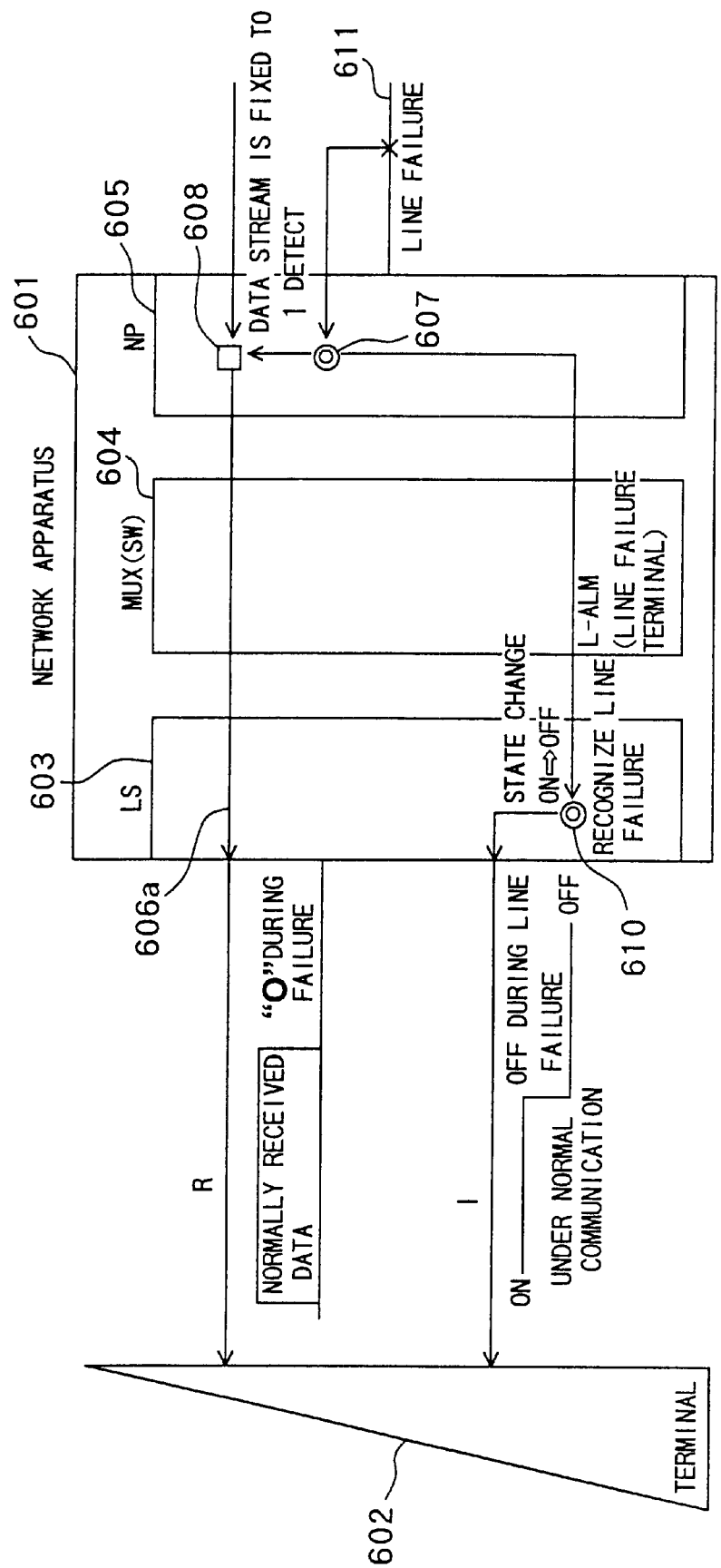
FIG. 7 is the explanatory diagram for explaining notification of a line failure to a terminal apparatus according to an embodiment 2 of the present invention.

FIG. 7 represents such a system that the terminal apparatus 602 of FIG. 6 is replaced by ITU-TX.21. In this replacement case, when a failure occurred in an external line 611 is recognized, the line failure recognizing unit 610 switches an I path from the normal line communication (ON) to the abnormal line communication (OFF).

Other arrangements of this system are similar to those of FIG. 6.

Embodiment Mode 3

Figure 9:
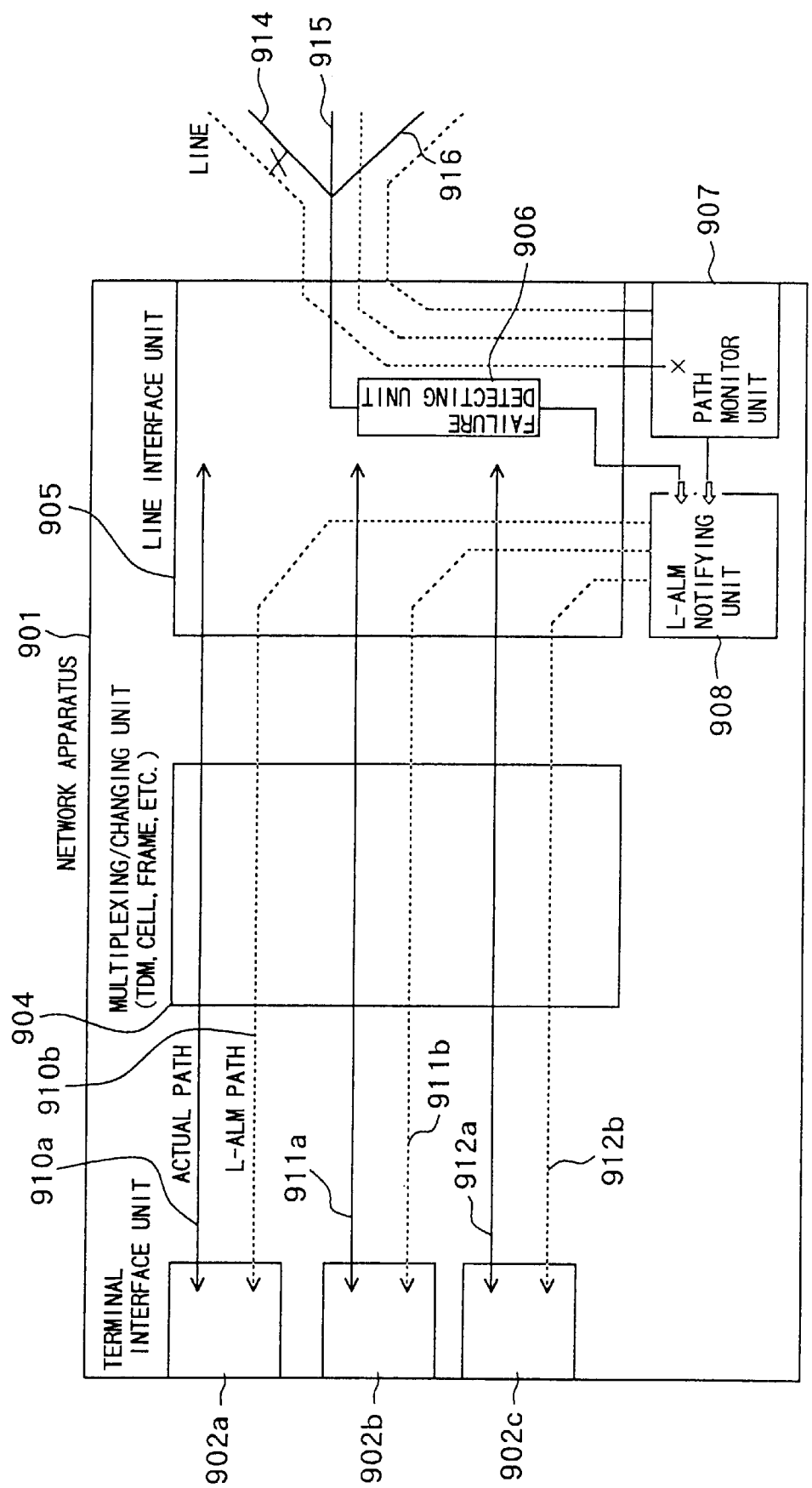
FIG. 9 is a functional block diagram for representing a network apparatus according to an embodiment 3 of the present invention.

FIG. 9 schematically indicates a network apparatus 901 according to an embodiment mode 3 of the present invention.

This network apparatus 901 is featured by that actual communication paths 910a, 911a, 912a, and failure notification paths 910b, 911b, 912b are provided via a multiplexing/changing unit 904 between terminal interface units 902a, 902c and a line interface unit 905.

The line interface unit 905 receives, or connects a failure detecting unit 906, and this failure detecting unit 906 owns a function capable of detecting a failure occurred in external lines 914 to 916.

A path monitoring unit 907 monitors a path of a line, and a failure notifying unit 908 terminates the failure notification paths 910b, 911b, and 912b.

Figure 10:
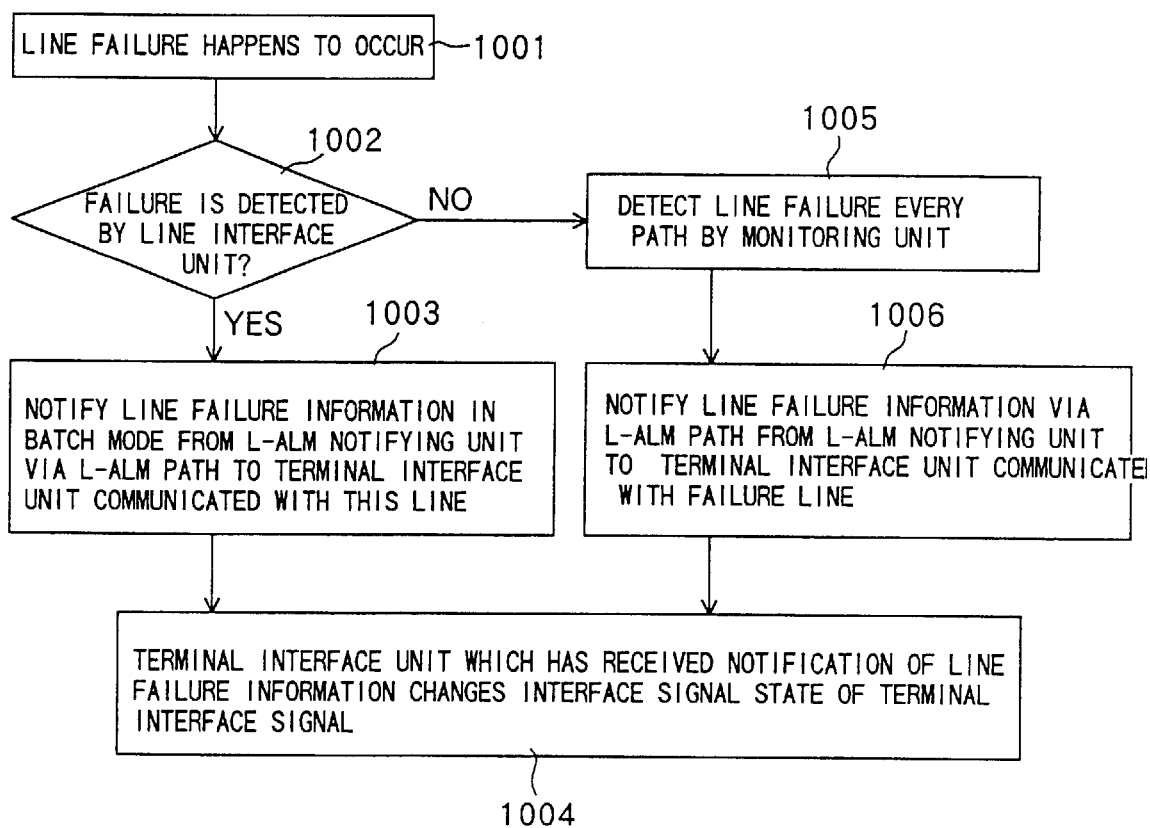
FIG. 10 is a flow chart for describing a sequential operation for notifying an occurrence of a line failure in the network apparatus according to the embodiment 3.

FIG. 10 represents a flow chart for explaining a process operation in the case that a failure happens to occur in a line of this network apparatus.

First, when a failure happens to occur in any of these lines (step 1001), the line interface unit 905 detects the occurrence of the failure (step 1002). Then, the failure notifying unit 908 notifies line failure information in a batch mode through failure notification paths 910b, 911b, 912b to all of the terminal interface units 902a through 902c which include such a terminal interface unit (for example, 902a) communicated with the line (in the case, line 914) where the above-described failure happens to occur. As a consequence, the terminal interface units 902a to 902c which have received the notification of the line failure change a signal state of a terminal interface signal so as to notify the line failure to the terminal apparatus. Since the change of the interface signal state has been explained with reference to FIG. 6 to FIG. 7, explanations thereof are omitted.

Also, in such a case that a failure occurred in a line (in this case, line 914) of a specific path is detected in the path monitoring unit 907 (step 1005), the failure notifying unit 908 notifies line failure information via the failure notification path 910b to the terminal interface unit 902a connected to the terminal apparatus communicated with the line where the failure happens to occur. As a result, the terminal interface unit 902a changes a signal state of a terminal interface signal so as to notify the occurrence of the failure to the terminal apparatus.

As described above, since the occurrence of the failure is monitored with respect to each of the communication paths, the line failure information is notified only to such a terminal interface unit communicated with the path where the communication state becomes abnormal. As a consequence, this network apparatus according to this embodiment mode 3 may be applied to solve a partial failure of a line, for example, a failure occurred in a branch line of a multiplex access line.

Embodiment Mode 4

Figure 11:
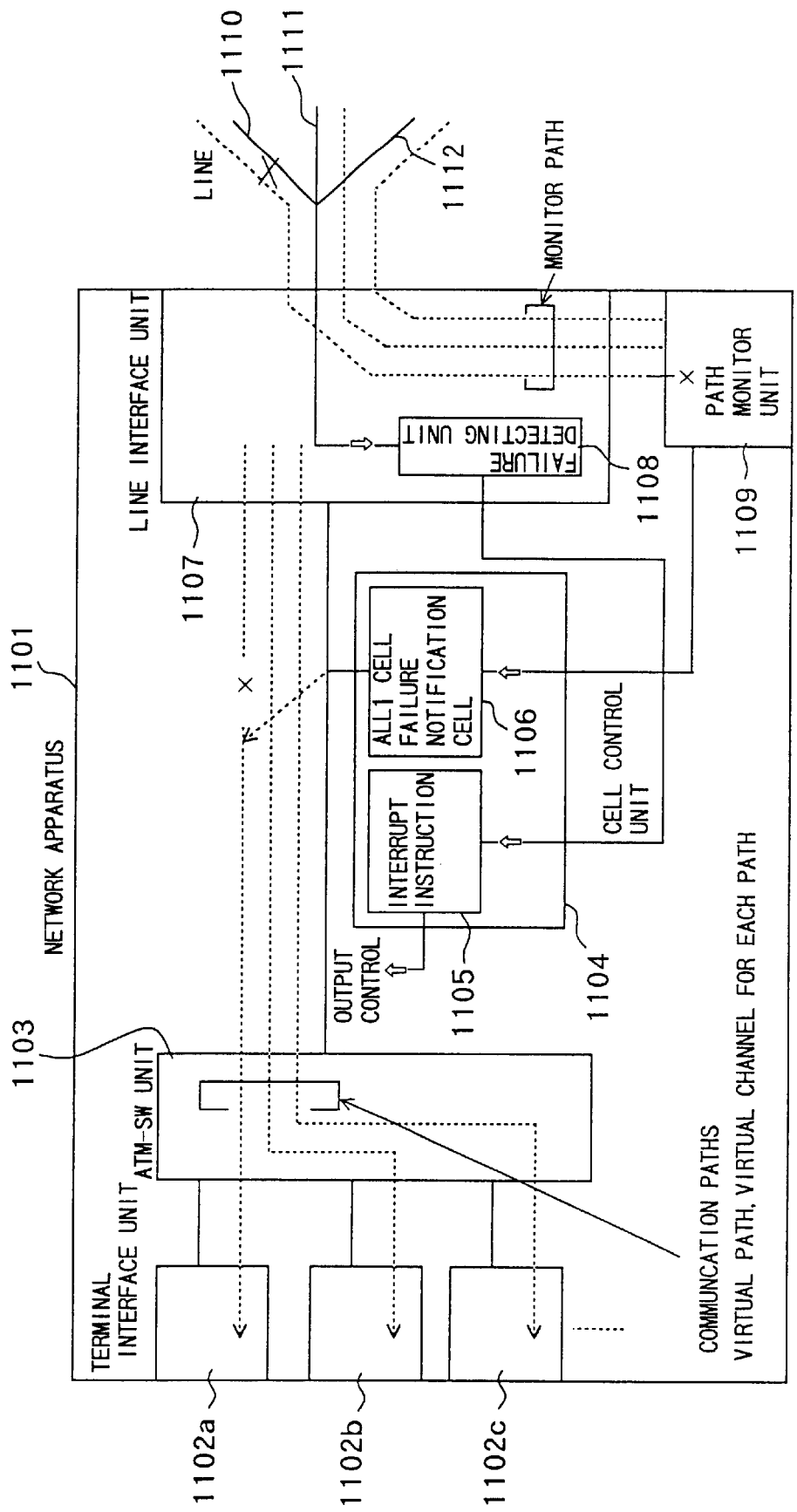
FIG. 11 schematically shows a network system in which the present invention is applied to an ATM switching apparatus, according to an embodiment 4 of the present invention.
Figure 12:
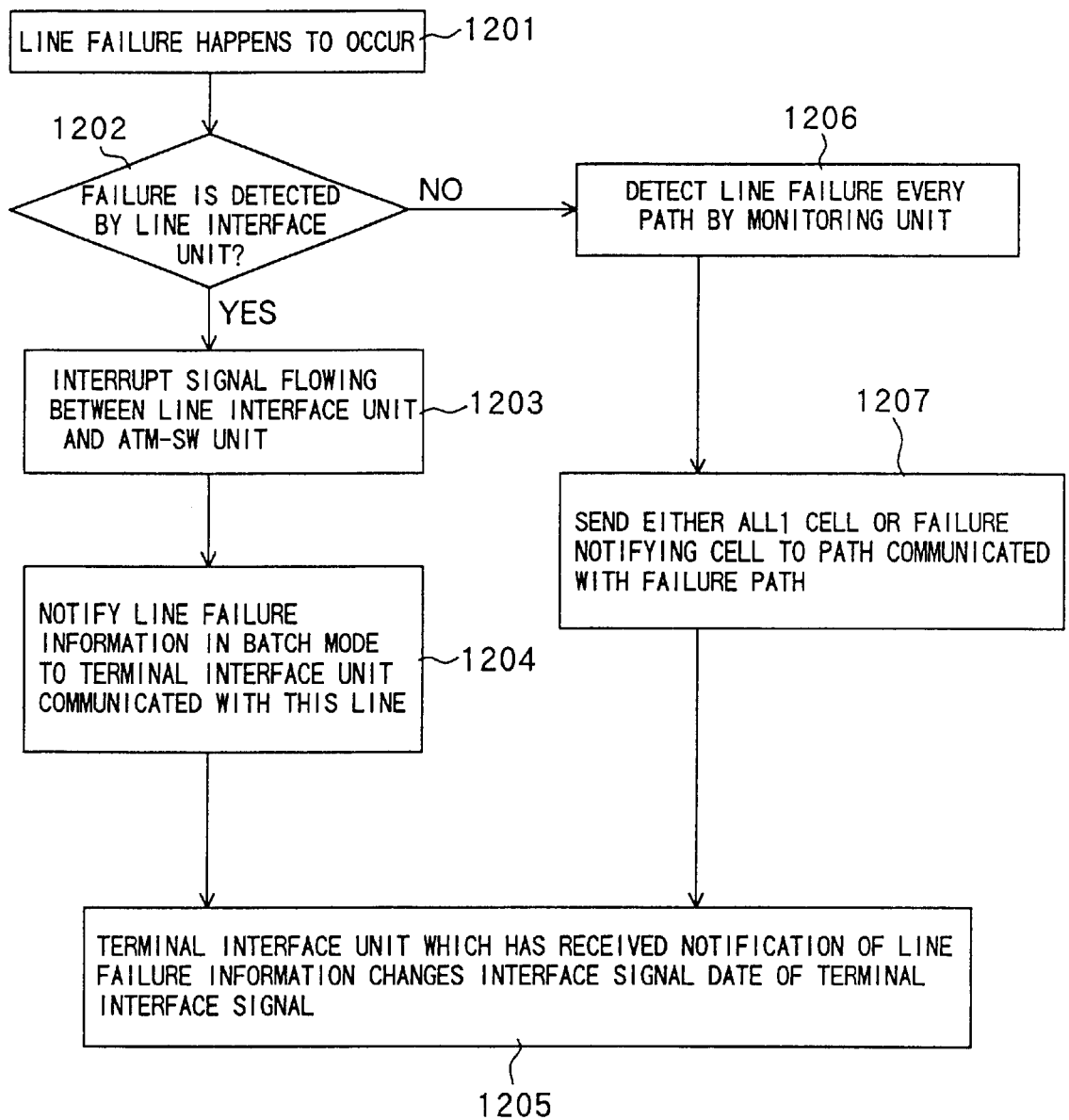
FIG. 12 is a flow chart for describing a sequential operation for notifying an occurrence of a line failure in the network system according to the embodiment model 4.

FIG. 11 schematically shows an ATM switching apparatus to which the present invention is applied.

A network apparatus 1101 corresponds to an ATM (Asynchronous Transfer Mode) switching apparatus, and contains a switch 1103 functioning as an ATM switch, terminal interfaces units 1102a to 1102c, and a line interface unit 1107. Both a failure detecting unit 1108 and a path monitoring unit 1109 of the line interface unit 1107 own similar functions to those of FIG. 9.

A cell control unit 1104 contains an output control unit 1105 for instructing to disconnect (interrupt) a line, and a failure notification cell producing unit 1106 for producing a failure notification cell.

First, when a failure happens to occur in any of the lines (step 1201), the failure detecting unit 1108 of the line interface unit 1107 detects the occurrence of the failure (step 1202). Then, the failure notification cell producing unit 1106 sends the failure detection notification to the output control unit 1105 of the cell control unit 1104. This output control unit 1105 interrupts the signal flowing between the line interface 1107 and the ATM switch 1103 (step 1203). Then, the failure notification cell producing unit 1106 notifies the occurrence of the line failure in the batch mode to the terminal interface units 1102a to 1102c (step 1204). Upon receipt of the above-described line failure notification, the terminal interface units (1102a to 1102c) change the signal state of the terminal interface signal, so that the occurrence of the line failure is notified to the respective terminal apparatuses.

On the other hand, when a failure occurred in a specific line 1110 is detected by the path monitoring unit 1109 (step 1206), this path monitoring unit 1109 notifies the occurrence of this failure to the failure notification cell producing unit 1106, so that either a cell having all values of "1" or a failure notification cell is transferred to such a path which is communicated with this failure path (step 1207).

Upon receipt of the cell produced from the failure notification cell producing unit 1106, the terminal interface 1102a changes the signal state of the terminal interface signal, so that the failure occurred in the specific line 1110 is notified to the terminal apparatus.

As previously described, in accordance with this embodiment mode 4, in the ATM apparatus containing the terminal interface units 1102a to 1102c and the line interface unit 1107, when the occurrence of the failure is detected, any one, or all of the below-mentioned functions are owned. The terminal interface units 1102a to 1102c receive the terminal apparatus such as TDM. The line interface unit 1107 is used to connect the ATM switch 1103 with the high speed digital line, and this ATM switch 1103 cross-connects these terminal interface units 1102a to 1102c. That is:

(1) a function to interrupt the signals appearing between the terminal interface units and the line interface in a batch mode.

(2) a function to produce such a cell to the ATM switch 103, in which the values of "1" have been stored into all of payloads.

(3) a function to produce a failure notification cell recognizable by the terminal interface units 1102a to 1102c and also to send this failure notification cell to the ATM switch 1103. When the occurrence of the failure is detected in the ATM switching apparatus, since these functions are available, the line failure can be recognized by the terminal interface units 1102a to 1102c. Then, the signal states of the terminal interface units with respect to the sort of these terminal interface units are changed, so that the line failure can be notified to the terminal apparatus such as TDM.

Also, the path monitoring unit 119 is employed so as to monitor the occurrence of the failure with respect to each of the communication paths, the line failure information is notified only to such a terminal interface unit communicated with the path where the communication state becomes abnormal. As a consequence, this network apparatus according to this embodiment mode 3 may be applied to solve a partial failure of a line, for example, a failure occurred in a branch line of a multiplex access line.

As previously described in detail, in accordance with the present invention, in the various sorts of networks, when the failure happens to occur, the occurrence of this failure is notified to the appliance provided on the terminal side by such that the signal state in the physical layer of the connection interface is changed by the appliance provided on the network side. As a consequence, since the terminal apparatus can recognize the occurrence of the line failure within a short time period, various failure avoiding measurements, can be quickly carried, for instance, the present line is detoured to another line, and the back-up operation to a separate line is quickly performed.

What is claimed is:

1. A network apparatus comprising:
   means for receiving a bit stream from each of terminal side apparatuses, each bit stream is replaced to a fixed value when a failure of a line between network apparatuses is detected;
   means for multiplexing the plurality of bit streams from the terminal side apparatuses in series to generate a multiplexed bit stream; and
   means for transmitting the multiplexed bit stream to the other network apparatus via a control line, the other network apparatus is connected to the network apparatus via the line and monitoring the failure of the line.

2. A network apparatus to which a plurality of terminal apparatuses are connected, comprising:
   a plurality of terminal interfaces for receiving signals via lines connected from the plural terminal apparatuses;
   multiplexing means for bit-multiplexing signals derived from the plural terminal interfaces thereby producing a multiplexed bit stream signal;
   failure-occurrence-notifying bit producing means for replacing said multiplexed bit stream signal by a failure-occurrence-notifying bit stream which implies an occurrence of a failure when a failure occurrence in a line is detected, wherein part of said multiplexed bit stream signal are reversed in a fixed value data stream; and
   failure-problem processing means for detecting said failure-occurrence-notifying bit stream within said network apparatus to thereby process a line failure problem with respect to a terminal apparatus.

3. A network apparatus as claimed in claim 2, further comprising:
   bit operating means interposed between said multiplexing means and said failure-occurrence-notifying bit producing means, for rewriting said bit stream signal, thereby to prevent generating a certain bit stream which implies an occurrence of a failure.

4. A network apparatus to which a plurality of terminal apparatuses are connected, comprising:
   a terminal interface for receiving signals via lines connected from the plural terminal apparatuses, including failure notifying means for notifying an occurrence of a failure to said terminal apparatuses;
   a line interface connected to an external line, including failure detecting means for detecting a failure of said external line;
   an actual data path for connecting said terminal interface to said line interface within said network apparatus, and transmitting actual data from said line interface to said terminal interface; and
   a failure notification path set to said failure detecting means and said failure notifying means.

5. A network apparatus as claimed in claim 4 wherein:
   said network apparatus is further comprised of:
   a plurality of terminal interfaces each connected via an external line of said network apparatus to a plurality of other network apparatuses and other terminal apparatuses, and also connected to said plurality of terminal apparatuses;
   said line interface includes:
      line condition monitoring means for monitoring the occurrence of the failure with respect to each of the external lines; and
      a failure notifying unit for notifying the occurrence of said failure to a terminal apparatus of said plurality of terminal apparatus communicated with the external line where the occurrence of the failure is detected by said line condition monitoring means; and
      failure notification paths are set between said failure notifying unit and each of said plurality of terminal interfaces.

6. An ATM switching apparatus interposed between a plurality of own terminal apparatuses and an external line, comprising:
   a terminal interface for receiving signals via lines connected from said plurality of own terminal apparatuses;
   an ATM switch for switching a cell between said plurality of own terminal apparatuses and said external line;
   a line interface for receiving signals via the external line and for including failure detecting means for detecting a failure occurred in the external line;
   path monitoring means for specifying a path of the external line where the failure happens to occur;
   failure-notifying cell producing means for producing and transmitting a failure-notifying cell for notifying an occurrence of a failure by changing a state of a payload signal to such a terminal apparatus for connecting with the external line where the failure happens to occur in response to information transmitted from said failure detecting means, or said path monitoring means; and
   output control means for instructing said ATM switch to be turned OFF.

* * * * *